United States Patent [19]

Degelman

[11] 4,318,524

[45] Mar. 9, 1982

[54] BENT BOLT CLAMP

[75] Inventor: Wilfred J. Degelman, Regina, Canada

[73] Assignee: Degelman Industries Ltd., Regina, Canada

[21] Appl. No.: 78,601

[22] Filed: Sep. 24, 1979

[51] Int. Cl.³ .............................................. F16M 13/00
[52] U.S. Cl. ................................. 248/214; 248/226.3; 403/191
[58] Field of Search ....................... 248/72, 214, 226.3, 248/228, 219.4, 316 C; 403/191, 233, 235; 24/243 C

[56] References Cited

U.S. PATENT DOCUMENTS

| | | | |
|---|---|---|---|
| 928,010 | 7/1909 | Way | 248/226.3 |
| 1,097,414 | 5/1914 | Fort | 248/226.3 |
| 1,110,496 | 9/1914 | Kobert | 248/226.3 |
| 1,738,875 | 12/1929 | Duffy | 248/226.3 |
| 1,877,312 | 9/1932 | Heinrich | 248/226.3 X |
| 1,898,725 | 2/1933 | Hamilton | 248/226.3 X |
| 2,507,783 | 5/1950 | Graham | 248/228 X |
| 3,472,475 | 10/1969 | Rudiger | 248/228 |

FOREIGN PATENT DOCUMENTS

| | | |
|---|---|---|
| 100979 | 9/1906 | Canada . |
| 254085 | 9/1925 | Canada . |
| 490153 | 2/1953 | Canada . |
| 524118 | 4/1956 | Canada . |
| 630974 | 11/1961 | Canada . |
| 848176 | 8/1970 | Canada . |
| 898586 | 4/1972 | Canada . |
| 977601 | 11/1975 | Canada . |

Primary Examiner—William H. Schultz
Attorney, Agent, or Firm—Christensen, O'Connor, Johnson & Kindness

[57] ABSTRACT

A bent bolt clamping arrangement for clamping a mechanism to a beam of rectangular cross-section. Three beam engaging elements lying substantially in a plane are arranged to form a U-shaped configuration to snugly fit three faces of the beam. One of the elements is flanged to form an outwardly flared free end of the U. A bent bolt connects the free ends of the U at right angles, the bent portion of the bolt extending substantially perpendicularly to the flanged element.

3 Claims, 3 Drawing Figures

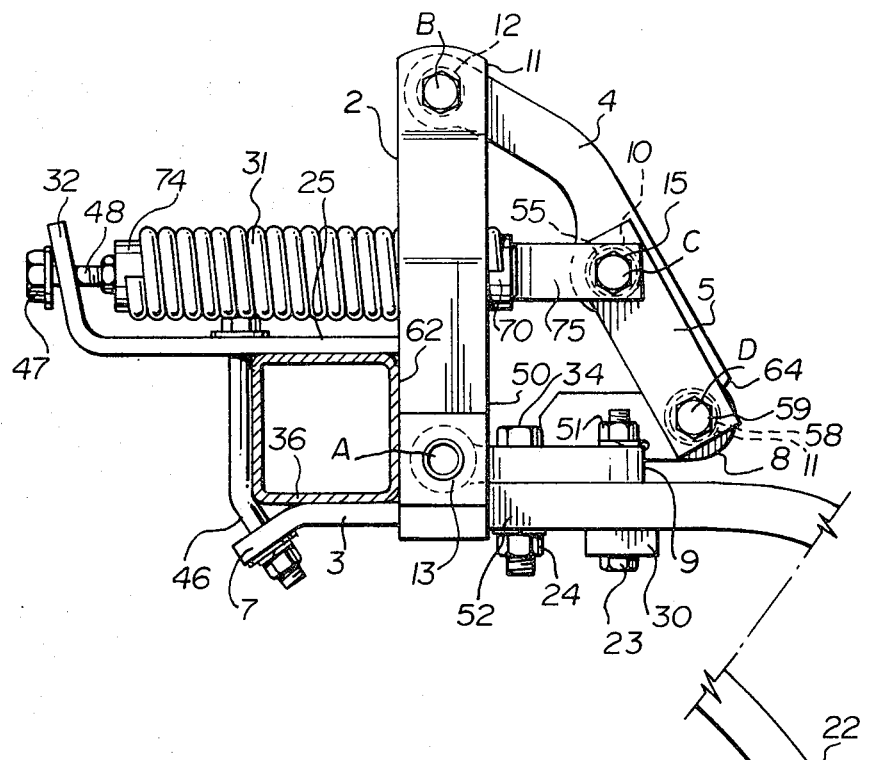
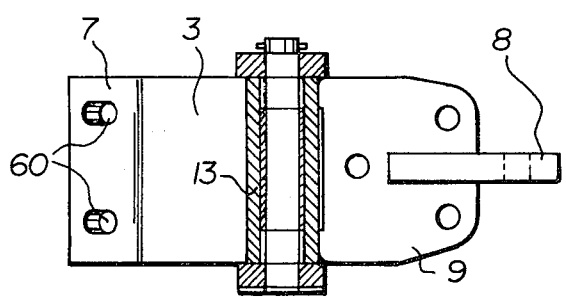
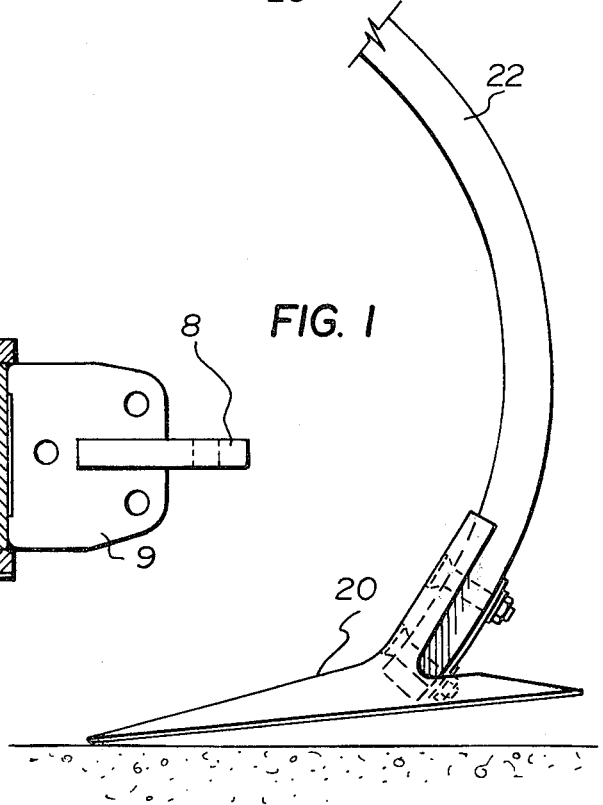

BENT BOLT CLAMP

BACKGROUND OF THE INVENTION

This invention relates to a clamping arrangement for clamping a mechanism to a beam of rectangular cross-section.

1. Description of the Prior Art

A number of farm and other implements, such as cultivators, include attached work tools such as cultivator shovels which engage the surface of the earth or penetrate it slightly as the implement is pulled by a tractor or similar vehicle. The cultivator or similar implement typically includes a means for attaching the implement to a beam mounted on or forming part of the pulling vehicle. Since the implement is passed over the land, it is necessary that the attaching means be capable of withstanding forces which may tend to loosen the attachment. If the attachment becomes too loose, the operator must ultimately stop, dismount and retighten the attachment means.

In the past, such implements have typically been bolted directly on the vehicle mounted frame with one or more bolts. It has been found, however, that the forces imparted to the implement as it traverses the ground cause the bolts which attach the implement to the frame to work loose, even when the bolts are fitted with lock washers.

SUMMARY OF THE INVENTION

It is an object of the present invention to provide an improved clamping arrangement for clamping an implement to a beam of retangular cross-section. As noted above, such beams commonly constitute part of a pulling vehicle on which various implements such as cultivators or the like are to be mounted.

It is a further object to provide such a clamping arrangement which has improved resistance to a tendency to work loose when the implement traverses the ground as it is pulled by the pulling vehicle.

To this end, the present invention provides a clamping arrangement for attaching an implement to a beam of rectangular cross-section. The clamping arrangement comprises a U-shaped confirguration of beam-engaging surfaces or elements for engaging in a snug fit three faces of the rectangular beam on which the mechanism is to be mounted. One free end of the U is outwardly flared as a flanged portion for receiving one end of a bent bolt which meets the flanged portion at a right angle. In practice, it is considered preferable to use at least a pair of such bent bolts. Such bent bolts bend around the adjacent corner of the beam and then lie next to the fourth face of the beam, penetrating holes in the other free end of the U-shaped configuration, whereby the bolts when tightened onto the last mentioned free end of the U and onto the flanged portion of the opposing free end of the U, clamp the mechanism tightly to the beam.

The clamping arrangement may comprise a first beam-engaging element for engaging a first face of the beam, a second beam-engaging element for engaging a second face of the beam, a third beam-engaging element having a beam-engaging face for engaging a third face of the beam and a contiguous flanged portion at the free extremity of the beam-engaging face and lying at an acute angle thereto.

The first, second and third beam-engaging elements lie substantially in a plane and are arranged to form a U-shaped configuration snugly fitting the three faces of the beam. The second beam-engaging element is located at the trough of the U, and the flanged portion of the third beam-engaging element forms an outwardly flared free end of the U.

The clamping arrangement further includes at least one bent bolt connectable at right angles to the first beam-engaging element. The bolt has a first straight portion extending from the first beam-engaging element parallel to the second beam-engaging element for engaging the fourth face of the beam, a bent portion for bending around the corner at which the third and fourth faces of the beam meet, and a second straight portion extending from the bent portion substantially perpendicularly to the flanged portion of the third beam-engaging element and connectable thereto.

SUMMARY OF THE DRAWINGS

FIG. 1 is a side elevation view showing a preferred embodiment of a clamping arrangement in accordance with the present invention which is clamping a spring-release mechanism to a beam. A cultivator shovel is attached to the spring-release mechanism.

FIG. 3 is a detail plan view of the cultivator shank support plate of FIG. 1, including the flange which receives the bent bolts included in the clamping arrangement.

DETAILED DESCRIPTION WITH REFERENCE TO THE DRAWINGS

Figure 2:
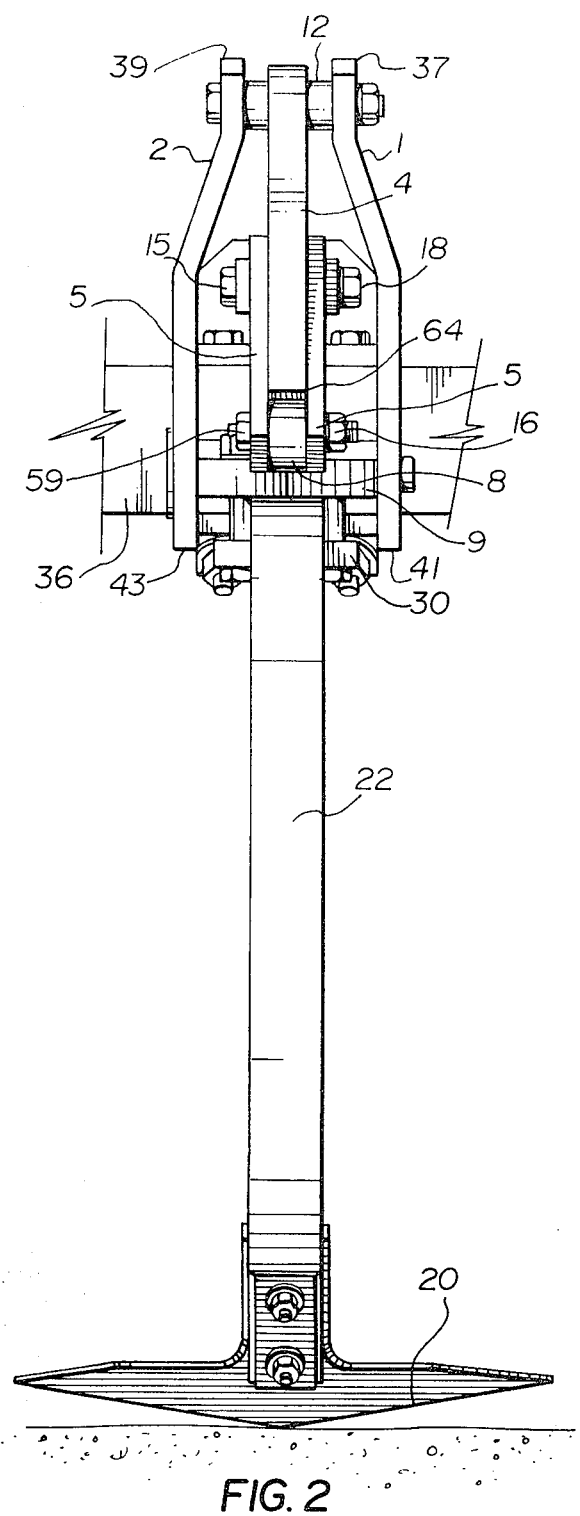
FIG. 2 is an end elevation view showing the clamping arrangement of FIG. 1.

The preferred embodiment to be described is an arrangement for clamping a spring-loaded release mechanism for use with a pivotally mounted, rearwardly-extending cultivator shovel support shank to a beam attached to the frame of an agricultural cultivator. As described, the clamping arrangement is included in the spring-loaded release mechanism, in the sense that no separate part of that mechanism of itself comprises the clamping arrangement. It will probably be convenient and economically advantageous to combine the clamping arrangement with the structure to be clamped to the beam. However, this description is not to be taken as limiting the invention; the invention has application to other situations in which a mechanism is to be clamped to a beam of rectangular cross-section.

The words "upper", "lower", "rearward", etc. are to be taken in a relative rather than an absolute sense, since the orientation in space of the release mechanism on other implements may change, depending upon the application.

Referring to FIGS. 1, 2 and 3, an agricultural cultivator includes a frame beam element 36 of rectangular (as depicted, square) cross-section which extends generally horizontal and traverse to the path of travel of the cultivator. A spring support plate 25 which comprises a "first beam-engaging element" for engaging a first face of beam 36 rests on top of the beam. Welded to plate 25 is a tower 11 formed by spaced, generally vertically upright tower posts 1 and 2. Tower 11 comprises a "second beam-engaging element" for engaging a second face of beam 36 at the forward edge 62 of tower posts 1 and 2. Welded to the lower extremities of tower posts 1 and 2 is a forwardly-extending beam-engaging plate 3 whose forward free end is outwardly flared as flange 7. Holes 60 in flange 7 and in spring support plate 25 the spring support plate holes are (not shown) receive bent bolts 46. Plate 3 comprises a "third beam-engaging element" for engaging a third face of beam 36. Spring support plate 25, the forward edge 62 of tower 11, and plate 3 lie substantially in a single plane and snugly embrace beam 36 in U-shaped configuration. The remaining side of beam 36 is engaged by bent bolts 46 which, when tightened against flange 7, force plate 3 upwards against beam 36 and the bolts 46 rearwards against beam 36 in a tight and secure clamping action.

The construction and operation of the spring loaded release mechanism which includes the clamping arrangement just described will now be discussed to facilitate an understanding of the manner in which the clamping arrangement may be combined in the construction of such a mechanism.

The free end 32 of plate 25 is bent upwards to form a spring mounting post.

Each of tower posts 1 and 2 has a slightly zig-zag shape (see FIG. 2) so that the uppermost ends 37, 39 of tower posts 1 and 2 are more closely spaced than are the lower extremities 41, 43 of the respective tower posts 1 and 2.

Shank 22 to which is bolted cultivator shovel 20 is clamped in place to the underside of a shank support plate 9 by means of transverse plate 30 bolted in place by bolts 23 and nuts 51, and also by bolt 34 and nut 24 which pass through mating holes in the shank support plate 9 and the upper forward end 52 of shank 22. Obviously, other clamping arrangement are possible, such as a plate on the underside of the shank 22 which could be provided with three holes mating with those accommodating bolts 23 and 34 in plate 9. The entire assembly including shovel 20, shank 22 and shank support plate 9 is free to rotate pivotally about a pin A by means of a pivotal mounting in the lower ends of tower posts 1 and 2 afforded by the pivotal engagement of cylindrical bushing 13 with pin A.

Bushing 13 which is pivotally mounted upon pin A (reference letter A will also be used hereinafter to refer to the associated lower tower pivotal mounting position to which pin A is central) is welded to shank support plate 9 for alignment with holes in the lower ends of tower posts 1 and 2. If desired, nylatron bearings may be disposed between the ends of bushing 13 and tower posts 1 and 2.

Passing through holes in the upper extremities 37, 39 of tower posts 1 and 2 is a pin B. (Reference letter B will also be used hereinafter to refer to the upper tower pivotal mounting position to which pin B is central). Pivotally engaging pin B is a cylindrical bushing 12 on which is pivotally mounted a downwardly rearwardly extending finger 4 centered on bushing 12 so that the finger is spaced from the tower posts 1, 2. Approximately halfway along finger 4 is a transverse hole in which a nylon bushing 10 is mounted. The nylon bushing encircles a steel bushing 55 through which bolt 15 passes. Bolt 15 also passes through mating holes in the upper ends of link arms 5 and is retained in place by nut 18. The two bushings 10 and 55, and the bolt 15 together function as a pivoting means to permit link arms 5 to pivot relative to finger 4. The collective elements comprising the pivotal assembly just described define pivotal connection position C designated in FIG. 1.

A similar pivot assembly comprising nylon bushing 58 and steel bushing 66, bolt 59 (passing through mating holes in link arms 5) and nut 16 comprise a rear pivotal mounting position generally designated as D in FIG. 1.

This pivotal connection is effected between a post 8 fixed to and protruding upwardly from and centrally of shank support plate 9 at the rear end thereof, and the lower extremities of link arms 5. This permits the link arms 5 to pivot about the post 8.

The upper rear surface (not shown) of rear post 8 is inclined at an angle to abut the inclined undersurface of the rear portion of finger 4, in rest position of the shank 22. The upper surface of rear post 8 thereby functions as a stop or motion limiting device. The shank support plate 9 cannot pivot any lower than is illustrated in FIG. 1, because for it to do so would require further downward pivotal movement of finger 4, which is rendered impossible by the engagement of the upper rear surface of rear post 8 with the inclined undersurface of the rear portion of finger 4.

Inserted in a hole in spring mounting post 32 is a bolt 47 having a threaded end 48 threadedly engaging spring end plug 74. A coil spring 31 is connected between end plug 74 and opposed end plug 70 connected by a threaded bolt (not shown) to U-shaped link element 75 pivotally engaging pin C. Spring 31 is normally in tension, so that finger 4 tends to pivot clockwise about pin B, thus forcing the finger-tip 64 into engagement with the upper rear surface of post 8 in the rest or normal operating position of the assembly. Thus, the shank 22 is restrained from upward counter-clockwise pivotal movement (as seen in FIG. 1) by the force exerted by spring 31. Bolt 47 can be turned with respect to threaded plug 74 to adjust the spring tension of spring 31.

Finger 4, links 5, and shank support plate 9 may move in response to upward pivotal movement of shank 22, as when clearing an obstacle encountered on the surface of the earth by shovel 20. Since shank 22 is rigidly clamped to support plate 9, the upward motion of shovel 20 forces the shank support plate 9 to pivot upwardly (counter-clockwise as seen in FIG. 1) about pivot location A. Pin D moves upward and forward, forcing the link arms 5 upwards and into a more vertical aspect. The upward motion of link arms 5 in turn forces the finger 4 to pivot upwardly and counter-clockwise as seen in FIG. 1 to assume a more horizontal aspect. Pin C is also perforce moved upwardly and rearwardly, and the rearward component of the displacement of the spring 31 generates an increase in the spring force exerted on the finger 4 and consequently on the entire linkage, thus tending to increase the return force tending to counteract the upward displacement of shank support plate 9.

The design described above incorporates conventional principles of balance and symmetry. Thus, shank 22, post 8, finger 4, coil spring 31 and bolt 47 lie substantially in a vertical plane, whilst link arms 5, U-bracket 75, and tower posts 1 and 2 are symmetrical about the vertical plane. Obviously the choice of which of the elements are to be provided singly within the plane and which are to be provided doubly and symmetrically about the vertical plane is to a large extent within the designer's discretion. Reference in the singular to various of the components in the accompanying claims should be taken as importing either an actual singular element or double symmetrical elements, in accordance with commonly accepted design principles.

Other obvious variations, modifications and departures from the specific assembly described above will readily occur to those skilled in the art without departing from the spirit of the invention. The scope of the invention is as set forth in the accompanying claims.

What is claimed is:

1. A clamping arrangement for clamping an implement to a beam of rectangular cross-section, said clamping arrangement comprising:
    a first beam-engaging element for engaging a first face of the beam;
    a second beam-engaging element for engaging a second face of the beam;
    a third beam-engaging element having a beam-engaging face for engaging a third face of the beam and a contiguous flanged portion at the free extremity of the beam-engaging face and lying at an acute angle thereto;
    the first, second and third beam-engaging elements lying substantially in a plane and arranged to form a U-shaped configuration snugly fitting the said three faces of the beam, the second beam-engaging element being located at the trough of the U, and the flanged portion of the third beam-engaging element forming an outwardly flared free end of the U; and
    at least one bent bolt connectable at right angles to the first beam-engaging element and having a first straight portion extending from the first beam-engaging element parallel to the second beam-engaging element for engaging the fourth face of the beam, a bent portion for bending around the corner at which the third and fourth faces of the beam meet, and a second straight portion extending from the bent portion substantially perpendicular to the flanged portion of the third beam-engaging element and connectable thereto.

2. A clamping arrangement as defined in claim 1, wherein the first beam-engaging element and the flanged portion of the third beam-engaging element are provided with holes through which the bent bolt passes.

3. A clamping arrangement as defined in claim 2, comprising at least two said bent bolts spaced from one another, each when connected to the first and third beam-engaging elements lie in beam-engaging relationship with the fourth face of the beam.

* * * * *